March 6, 1951  T. ROBINSON  2,544,047
APPARATUS FOR PULVERIZATION AND DISPERSION OF MATERIALS
Filed Jan. 11, 1945  2 Sheets-Sheet 2

INVENTOR.
THOMAS ROBINSON
BY
Robert E. Burns
ATTORNEY.

Patented Mar. 6, 1951

2,544,047

UNITED STATES PATENT OFFICE 2,544,047

APPARATUS FOR PULVERIZATION AND DISPERSION OF MATERIALS

Thomas Robinson, New York, N. Y., assignor to Lancaster Chemical Corporation, a corporation of New York Application January 11, 1945, Serial No. 572,379

7 Claims. (Cl. 241—153)

The present application is a continuation in part of my copending application, Serial No. 550,728, now Patent Number 2,462,554, dated February 22, 1949, and relates to a method and apparatus for treating materials to change their physical, chemical, pathological or other properties. For example, the method and apparatus of the present invention is applicable in making a suspension of one liquid in the form of small droplets within another liquid. The invention is likewise applicable to the formation of a suspension of finely divided solids in a liquid. An outstanding feature of the present invention is that it provides means for reducing the particle size to an extremely low value, for example, to less than one micron. It will be understood that the term "particle" is used in a generic sense to refer to particles of a solid and also to globules or droplets of a liquid, as for example, in an emulsion.

The microscopic pulverization of material in accordance with the present invention has many important uses and advantages. For example, the reduction of particle size to extremely small values contributes to the stability of an emulsion or a dispersion and has been found to result also in other advantages such as reducing the curd tension and digestibility of milk. Moreover in many other instances it is desirable to pulverize solids to an extremely fine state. The present invention has been found particularly efficacious for this purpose. The invention is also applicable to cases where a reduction in particle size may be of only incidental importance, as for example, the pulverization of bacteria to kill them and thereby reduce the live bacteria count of a material.

As the particle size of a material becomes smaller, it is more and more difficult to obtain further reduction. It is still more difficult to achieve a particle size of the order of one micron or less in a practical commercial process as distinguished from laboratory methods. In a commercial process it is necessary to consider not only the ultimate size of the particle produced, but also such factors as rate of production, uniformity of product, economy of operation, original cost and required maintenance of the apparatus, and general practicability. The commercial preparation of dispersions of extremely small particle size thus presents a difficult problem.

It has heretofore been proposed to subject materials in a liquid state to vibration in the sonic or super-sonic range, depending on the effect of compression waves generated in the material and on cavitation produced by such waves to produce the emulsion. This action has been found slow and ineffective, particularly when it is desired to reduce the size of solid particles suspended in a fluid. Moreover, the compression waves and any cavitation produced thereby have been found to vary with the inherent nature of the material and the conditions under which it is treated, and these factors are not always subject to satisfactory control.

It is an object of the present invention to provide a novel and effective method of treating material, for example, in the preparation of emulsions or dispersions whereby the particle size can be reduced to exceedingly low values, for example, to a fraction of a micron. Another object of my invention is to provide a method of treating materials wherein particle sizes of the order of a micron or less can be produced rapidly and economically on a commercial scale, as distinguished from theoretical or laboratory methods. A further object of the present invention is to assure a uniform reduction of particle size whereby the time and expense of classifying and retreating the material is reduced or eliminated.

In accordance with my novel method the material to be treated is subjected simultaneously to impact and vibration. The combination of impact and vibration acting on the material simultaneously has been found to produce results not heretofore obtainable by vibration alone, or by impact alone. The term "vibration" is herein used to designate true vibration, preferably in the sonic range, as distinguished from mere agitation, stirring or shaking.

In carrying out the method of my invention with the apparatus herein illustrated, the material while being subjected to vibration, is simultaneously subjected to impact between opposed impact surfaces produced by the reciprocatory vibrations of said surfaces relative to one another. The impact surfaces may for example be the surfaces of coopertaing impact elements, or of impact elements and the wall of a receptacle, or treating chamber for the material. Relative reciprocation of the impact surfaces in a direction approximately perpendicular to the surface produces crushing impact, as distinguished from abrasion or attrition. This impact, in conjunction with the simultaneous vibration to which the material is subjected, rapidly and effectively reduces the particle size of the material being treated. A feature of the present invention is that all portions of the material are uniformly treated so that uniform reduction in particle size is achieved.

Other objects and advantages of my invention will be apparent from the following description and appended claims, in conjunction with the accompanying drawings, which illustrate by way of example apparatus for carrying out my invention.

Figure 1:
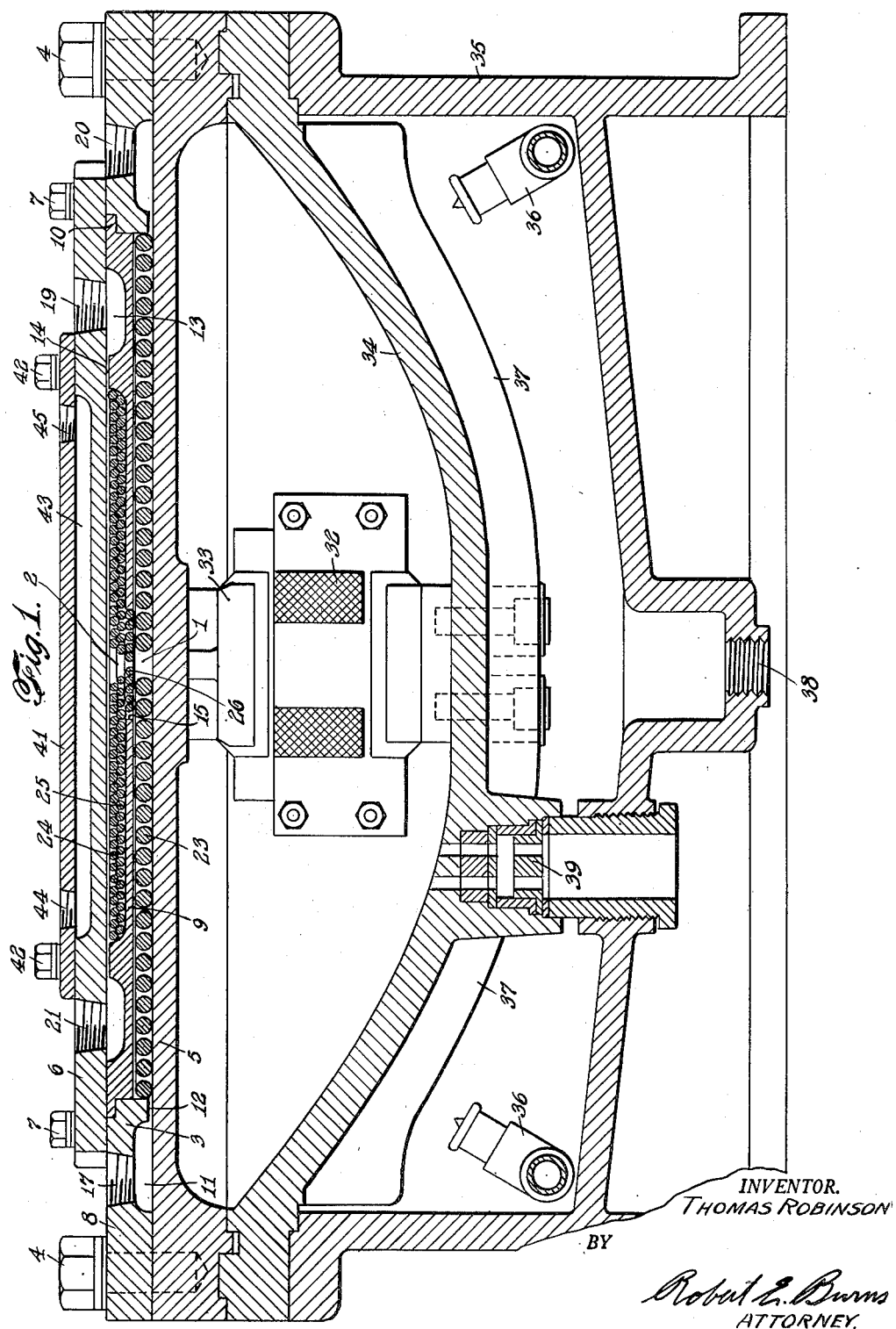
Fig. 1 is a vertical cross section of one form of apparatus in accordance with my invention.
Figure 2:
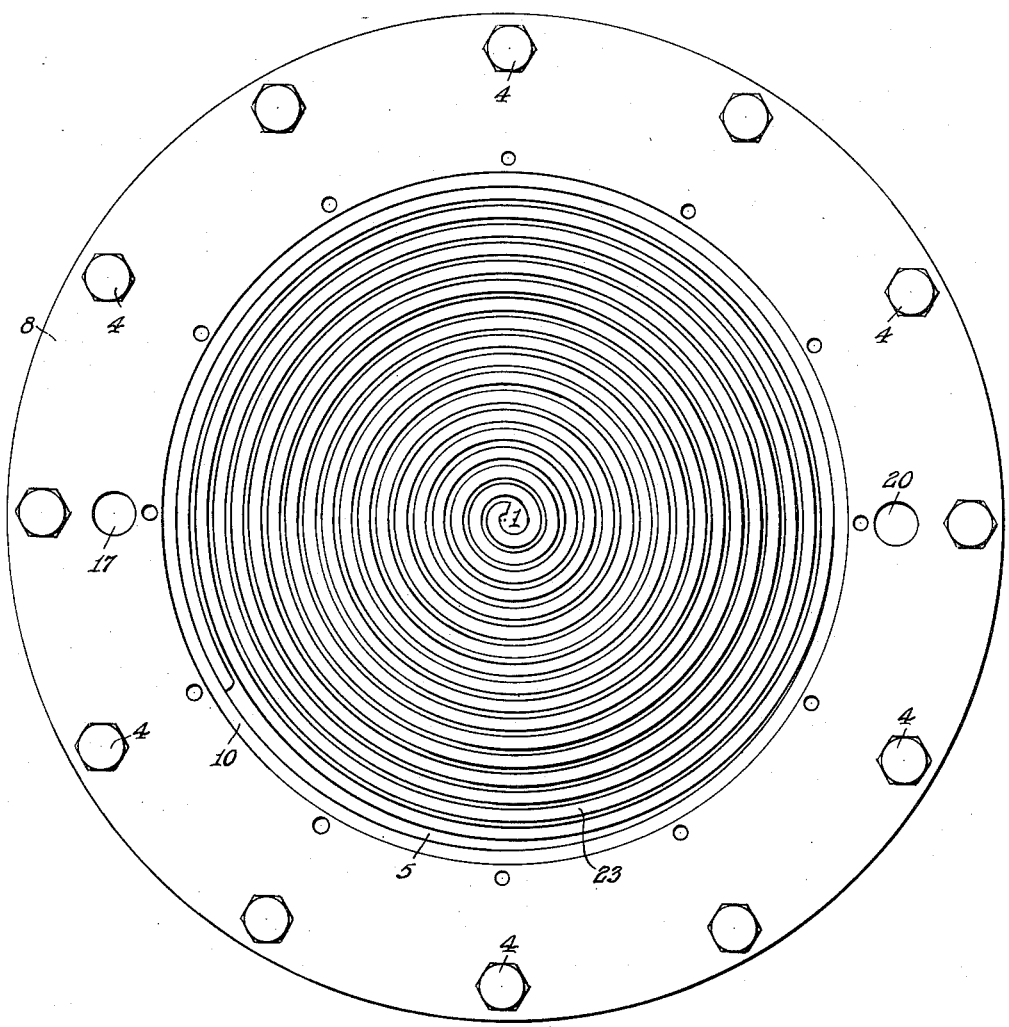
Fig. 2 is a plan view of the apparatus shown in Fig. 1 with the upper portion of the apparatus removed to show the interior.

In Figs. 1 and 2 of the drawings, there is shown by way of example, one embodiment of apparatus for carrying out my invention. In this embodiment of the apparatus, a plurality of treating zones or chambers, 1 and 2 (Fig. 1) are provided by a series of superposed walls which are united with one another at their peripheries and have central portions that are spaced apart to form the treating chambers. A wall 3 constituting the upper wall of the lower treating chamber 1 is connected by a plurality of bolts 4 with a wall or diaphragm 5 which forms the lower wall of the chamber 1. The wall 3, which forms the upper wall of the lower treating chamber, also forms the lower wall of the upper treating chamber 2. A wall 6 connected at its periphery to the wall 3 by a plurality of bolts 7 forms the upper wall of the treating chamber 2. For convenience of manufacture and subsequent cleaning and maintenance of the apparatus, the wall 3 is made in two pieces comprising an annular peripheral portion 8 and a central portion 9. The central portion 9 has an annular flange 10, which seats in a corresponding groove or recess provided in the peripheral portion 8. It will be seen that by removing the bolts 7, the wall 6 and the central portion 9 of the wall 3 can be lifted off, giving access to both of the treating chambers. It will be understood that in assembling the superposed walls forming the treating chambers, suitable spacers may be used at the periphery of the walls to secure the desired spacing, and that suitable gaskets may be employed to insure a fluid tight joint between successive walls.

The peripheral portion 8 of the wall 3 is shaped to provide an annular passage or manifold 11 communicating with the treating chamber 1 through a restricted opening 12. A similar passage or manifold 13 surrounds the treating chamber 2 and communicates therewith through a restricted opening 14. Moreover, the treating chambers 1 and 2 communicate with each other through a central opening 15 formed in the central portion 9 of the wall 3. The fluent material to be treated is passed through the treating chambers by means of suitable fluid connections with the annular manifolds or passageways 11 and 13. For example, a suitable feed pipe (not shown) may be screwed into a threaded inlet opening 17 communicating with the manifold 11, while a discharge pipe (not shown) may be screwed into a threaded outlet 19 communicating with the annular manifold 13. Additional openings 20 and 21 communicating respectively with manifolds 11 and 13 may be provided as desired, either for convenience in forcing steam or other fluids through the apparatus to clean it, or for feeding material to or discharging it from the treating chambers, as desired. Using the opening 17 as an inlet and the opening 19 as an outlet, for the material to be treated, it will be seen that the material entering through the inlet 17 is distributed around the treating chamber 1 by the manifold 11 and hence flows radially inwardly to the central opening 15 in the wall 3. The material thereupon passes upwardly through this opening and reverses its direction of flow, flowing radially outwardly to the manifold 13, and hence around the manifold to the discharge opening 19. The material flowing inwardly from all parts of the circumference of the treating chamber 1, thus converges in the central opening or passageway 15. It thereupon flows outwardly to all parts of the circumference of the treating chamber 2 and after passing through the restricted opening 14 and around the manifold 13, again converges at the outlet 19. The change in the direction of flow and the repeated conversion and dispersion of the material resulting from this arrangement contributes to thorough and complete commingling and mixing of all portions of the material, so that the resulting product is uniform throughout. It will be understood that additional treating chambers may be provided as desired, successive chambers communicating with one another in such manner that the direction of flow of the material is changed each time it passes from one treating chamber to the next. It will further be understood that the direction of flow of the material through the apparatus may be reversed so that the material enters the upper chamber, for example, through the opening 19 and is discharged from the lower chamber, for example, through the opening 17. Moreover, while reference has been made to superposed walls and superposed treating chambers, the walls need not be horizontal as shown by way of example in the drawings.

In the lower treating chamber 1 there is provided an impact member which is shown as a convoluted grid 23 formed from a continuous length of wire or rod, for example a stainless steel wire, wound into spiral form (Fig. 2). The diameter of the wire in a vertical direction, and hence the thickness of the grid, is less than the space in which the grid is located to provide room for reciprocatory vibrational movement of the grid relative to the walls of the chamber or space. The spirally wound impact member forms a series of convolutions which are approximately concentric or coaxial with one another. The convolutions of the grid thus present a series of ridges or crests alternating with a series of spaces or valleys across which the material flows in passing approximately radially of the grid from the annular manifold 11 to the central opening 15.

The upper treating chamber is also provided with one or more impact members which may if desired be the same as the grid 23 of the lower chamber. However, in the embodiment illustrated in the drawings, the upper chamber contains two spiral grids 24 and 25 superimposed on one another. The grids 24 and 25 are shown as being wound of smaller wire than the grid 23 of the lower chamber, but may otherwise be the same or similar. The space between the opposed walls of the upper treating chamber is sufficient to permit vertical reciprocatory movement of the grids relative to the walls and relative to one another. A smaller spiral grid 26 is disposed in the central opening 15 of the separator plate 9 between the upper and lower treating chambers, so that in the central portion of the chambers there are four grids superimposed one above the other.

The successive convolutions of the grids may be substantially in contact with one another or may be slightly spaced as shown. It will be understood that the number of grids in the treating chamber, the size of wire forming the convolutions, the spacing of the convolutions, etc., may be varied as desired. In the particular arrangement shown in the drawings, the single grid 23 of larger diameter of wire in the lower treating chamber, provides initial pulverization of the material, while the superimposed grids 24 and 25 of smaller diameter of wire in the upper chamber, provide a second stage of pulverization. It will be understood, however, that in accordance with my invention, a single treating chamber may be used.

During passage of the material through the treating chambers as described above, the material is subjected simultaneously to intense vibration and impact, by producing relative reciprocatory vibration of the grids or impact members and the walls of the treating chamber. In the embodiment shown in Figs. 1 and 2 of the drawings, the vibration and impact is produced by applying vibratory energy to the diaphragm 5 forming the lower wall of the lower treating chamber 1. In this embodiment the diaphragm is vibrated by means of an electro-magnet 32 acting on an armature 33 provided on the under side of the diaphragm 5. The electro-magnet 32 is mounted in a dish-shaped support 34 which also supports the diaphragm 5 at its periphery, and is in turn supported by a base 35. To regulate the temperature of the electro-magnet and associated parts, a heat regulating fluid is preferably directed against the under side of the magnet support 34, a plurality of nozzles 36 being shown for this purpose. The under side of the support 34 may be provided with a plurality of fins 37, which preferably extend radially of the support and facilitate heat transfer as well as rigidifying and strengthening the supporting member. The bottom of the base 35 is shown provided with a drain 38 for draining off the heat regulating fluid which may be either discharged as waste, or recirculated. A fitting 39 is also shown extending through the bottom of the base 35 and the support 34 to provide for electrical connections to the magnet 32.

By supplying alternating or pulsating current of the proper frequency to the electro-magnet 32 the diaphragm 5 is set in vibration. The frequency of vibration of the diaphragm 5 is preferably in the sonic range, although in some instances a higher vibration may be desirable. For example, a frequency of 360 cycles per second with an amplitude of $\frac{1}{16}$ inch may be employed. The vibrational energy of the diaphragm 5 is transmitted to the other walls of the treating chambers and to the grids or impact members in the treating chambers to cause the walls and the impact members to vibrate relative to one another. The material being treated is thus subjected simultaneously to vibration and to impact between the surfaces of the impact members and the walls of the chambers.

The frequency, phase and amplitude of vibration of the chamber walls and the impact members depends, at least in part, on the characteristics of the respective members. By properly selecting the vibrating characteristics of the members, they are caused to vibrate relative to one another, producing rapidly recurring impacts between the grids and between the grids and the walls of the treating chambers. The frequency and amplitude of vibration is such as to produce an acceleration substantially greater than gravity to provide a power impact between the impact members at each end of the reciprocatory vibration rather than merely the impact of a falling body. By reason of the resilience of the spirally wound grids, the respective convolutions of the grids vibrate more or less independently of one another, so that the convolutions are free to vibrate as individual impact elements rather than en masse. The direction of vibration is substantially normal to the impact surfaces of the grids and the walls of the treating chamber and approximately perpendicular to the direction of flow of material through the chambers, except at the central portion where the material flows approximately in the direction of the vibratory movement. The vibration of the grids and of the walls of the treating chambers is thus reciprocatory in its nature as distinguished from circular motion.

Considering first the action of the lower treating chamber 1, it will be seen that in flowing from the annular manifold 11 to the central opening 15, the material being treated passes between the grid and the walls of the treating chamber in an approximately radial direction. The direction of flow is thus parallel to the diaphragm and to the central plane of the grid 23. The convolutions of the grid provide an undulating surface comprising a series of ridges and valleys across which the material must pass. These ridges and valleys extend across the path of travel of the material, so that the material must cross a plurality of ridges separated by intervening valleys. In passing over the socalled ridges, the material flows through the restricted spaces between the surface of the respective convolutions and the wall surface of the treating chamber. While passing through these attenuated spaces, the material is subjected to impact between the grid and the walls of the treating chamber, while simultaneously being subjected to intense vibration. The relative vibratory motion of the grid and the walls of the chamber is perpendicular to the direction of flow of the material, and approximately normal to the cooperating impact surfaces of the grid and the chamber wall, providing hammer-like blows, which effectively crush and pulverize the material being treated without causing undue abrasion or wear of the impact surfaces of the apparatus. As the ridges formed by the convolutions of the grid are continuous, or substantially so, and have line contact with the chamber wall, all the material must flow between the impact surfaces and thereby be subjected to treatment. There are thus no gaps through which material can flow from the inlet to the outlet without treatment. As all portions of the material receive substantially uniform treatment, a uniform reduction of particle size is assured. Moreover, the alternately converging and diverging surfaces of the convoluted grid and the chamber walls provide turbulence and thorough intermixing which contribute still further to the uniformity of the finished product. Still further action on the material being treated is produced by the fact that the grid vibrates rapidly back and forth between the walls of the treating chamber, causing the material to be forced rapidly through the attenuated spaces or openings between successive convolutions of the grid. The grid is thus in effect an apertured disc, which, in addition to the other action described above, is vibrated with reciprocatory movement in such manner that the material being treated is forced alternately in opposite directions through the attenuated openings extending through the disc. It will be understood that in referring above to the material passing "over" the convolutions of the grid, it is meant that the material flows around the convolutions, since it will pass beneath as well as above the grid.

The action in the upper treating chamber 2 in the embodiment of the apparatus shown in the drawings, is similar to that in the lower treating chamber 1, except that in addition to passing between a grid and the walls of the treating chamber, the material also passes between a plurality of grids, the general direction of flow being radial of the grids, and approximately parallel to the central planes of the grids and the walls of the chamber. The material is thereby subjected to impact between the grids and between the grids and the chamber walls. In passing through the central portion of the treating chambers, the material is subjected to the action of all four grids. The grids preferably extend substantially to the center of the treating chambers, but may if desired, have central holes or openings, as shown.

In addition to serving as impact elements for crushing and reducing the particle size of the material being treated, the grids provide a kinetic coupling for transmitting vibrational energy from the driven wall or diaphragm 5 to the other impact surfaces of the apparatus, i. e., the grids or impact elements and the walls of the treating chambers. Thus, although the diaphragm 5 is the only wall that is directly driven by the electro-magnet 32, the vibrational energy thereby produced is transmitted to the walls of the superimposed treating chamber 2 and to the grids in the treating chambers. As the respective elements of the vibratory system described are loosely coupled and free to vibrate individually, their frequency of vibration is determined at least in part by their inherent characteristics. Thus the natural frequency of vibration of the grids and of the walls 6 and 9 may be different from that of the diaphragm and one another, so that the respective elements vibrate out of phase and if desired at different frequency. Means is thus provided for causing at least certain of the impact surfaces to vibrate at a frequency higher than or lower than the principal frequency at which the diaphragm 5 is driven. In other words, the frequency of the vibrating elements may be different from that of the source of vibrational energy. Moreover, the amplitude of vibration of the respective impact surfaces may be different from that of the diaphragm, thus providing means for increasing the amplitude of the vibration, and thereby increasing the effectiveness of the impact surfaces.

The diaphragm 5 may, if desired, be vibrated substantially uniformly throughout its effective area. However, with the particular form of apparatus shown in Figs. 1 and 2, the amplitude of vibration will be greatest at the center of the diaphragm and a minimum at its periphery. This means that the most intense action on the fluent material being treated will occur at the center of the diaphragm where there are the most impact elements and where turbulence and thorough mixing of the fluent material occurs, owing to the reversal of its direction of flow in passing from one treating chamber to the succeeding chamber. It will be noted that the inlet and outlet connections for the fluent material are at the periphery of the treating chambers where the vibration is least. This location of the feed and discharge pipes eliminates difficulty in maintaining tight connections. Moreover, the central portions of the respective walls of the treating chambers are unimpeded by any external connections and are hence free to vibrate without obstruction.

It will be seen that by providing a plurality of superposed communicating treating chambers as described, vibrational energy which would otherwise be wasted by being dissipated to the atmosphere in the form of sound waves is effectively utilized to subject the material to treatment in succeeding chambers. As the amount of vibrational energy that can be applied to the diaphragm 5 is limited by the mechanical and electrical limitations of the equipment, the most efficient utilization of the vibrational energy available is highly important. Moreover, the utilization of this energy to do useful work in the succeeding treating chambers reduces the amount that is dissipated to the atmosphere in the form of noise, and thus materially reduces the noise level.

In the embodiment of my invention shown in the drawings, the dissipation of vibrational energy to the atmosphere is further reduced by at least partially enclosing the space above the cover plate 6 forming the upper wall of the upper treating chamber. As shown in Fig. 1, a wall member 41 is secured at its periphery by a plurality of bolts 42 to the peripheral portion of the wall 6, the central portions of the walls 6 and 41 being spaced apart to provide a chamber 43. The chamber 43 may if desired be evacuated to inhibit the dissipation of vibrational energy in the form of sound waves from the apparatus, or may be used for the circulation of a heat controlling medium, or other purpose. The chamber is provided with suitable inlet and outlet openings 44 and 45. The space between the dish-shaped support 34 and the diaphragm 5 may also be hermetically sealed and evacuated or used for the circulation of a cooling medium, by the provision of suitable inlet and outlet openings (not shown).

While the apparatus illustrated by way of example in the drawings is shown with two treating chambers superimposed on one another, it will be understood that a single treating chamber or any desired number of chambers connected in series or in parallel may be employed. Moreover, the term "treating chamber" is used in a generic sense to include any vessel, enclosure, tube, passageway, or other space in which the material is treated. The invention is thus not limited to a treating chamber formed between a diaphragm and a cover plate. Likewise, the form of the grid or impact means and the number of impact members in the treating chamber may be varied as desired. While shown as being made of a single wire or bar wound into spiral form, the grid or impact means may be formed as a disc or as a plurality of separate sections, as for example, a series of approximately concentric open or closed rings arranged one inside the other.

Figure 3:
Fig. 3 is a fragmentary cross sectional detail taken on the same plane as Fig. 1, but showing a modification.
Figure 4:
Fig. 4 is a fragmentary cross section similar to Fig. 3, but shows a further modification.

Two modifications of the grid or impact means are illustrated respectively in Figs. 3 and 4. In the modification shown in Fig. 3, the convolutions of the grid 123 are of flattened cross section, which may for example, be obtained by winding a round wire into spiral form and then flattening the grid between the plates of a press. The flattened cross sections provide a wider line of contact and hence a greater area of impact between the convolutions of the grid and the wall surfaces of the treating chambers.

In the modification shown in Fig. 4, the grid 223 comprises a small diameter spiral spring wound into a spiral. In other words, a wire is first wound into the form of a spiral spring, and the spring is then wound or coiled into spiral form to form the grid.

It will be understood that many other modifications of my invention may be made within the scope of the appended claims. Moreover, the method and apparatus in accordance with my invention is applicable to treating a wide range of materials. While being particularly suitable for the preparation or treatment of suspensions, emulsions, dispersions and other fluid or semifluid materials, my invention is in no way limited to such materials, but can also be used in treating solid material, for example, by blowing the material through the apparatus with a stream of air or other gaseous medium. My invention is thus susceptible of many uses and applications other than those herein referred to by way of example.

What I claim and desire to secure by Letters Patent is:

1. Apparatus for treating material, comprising a treating space for receiving said material and having spaced parallel wall surfaces, a flat spiral grid sandwiched between said surfaces, and means for vibrating said surfaces and grid relative to one another to produce rapidly recurring impacts between said grid and surface.

2. Apparatus for treating material, comprising a treating space having opposed parallel wall surfaces, a convoluted flat grid between said wall surfaces, and means for producing reciprocatory vibration and impact of said grid and wall surfaces relative to one another to produce rapidly recurring impacts between said grid and surface.

3. Apparatus for treating material, comprising a base, a diaphragm fixedly supported at its periphery on the base, a cover plate connected with said diaphragm at its periphery and having a central portion spaced therefrom to provide a treating chamber, a flat flexible grid between said diaphragm and cover and movable relative thereto, and means for producing reciprocatory vibration of said grid relative to said diaphragm and cover plate.

4. Apparatus for treating material, comprising a treating chamber having spaced parallel wall surfaces, a flat convoluted grid disposed between said surfaces and having a series of approximately concentric ridges separated by intervening spaces, and means for producing reciprocatory vibration of said grid relative to said wall surfaces.

5. In apparatus for treating material, a treating chamber having spaced parallel walls, an impact element disposed between said walls and comprising an elongated member wound into approximately spiral form, and means for producing relative vibratory movement between said impact element and the walls of said treating chamber to produce rapidly recurring impact between said impact element and walls.

6. Apparatus for treating material comprising a diaphragm, a cover plate connected with the diaphragm at its periphery and having a central portion spaced therefrom to provide a treating chamber, a spiral grid between the diaphragm and cover, and means for producing reciprocal motion of the diaphragm relative to the cover plate.

7. Apparatus for treating fluent material comprising spaced parallel walls forming a treating chamber, a flat spiral member interposed therebetween, an inlet and outlet for passing fluent material through said treating chamber, the inlet and outlet being disposed one at the center and the other at the periphery of the spiral member and means for producing relative vibratory movement and impact between said walls and spiral member.

THOMAS ROBINSON.

REFERENCES CITED

The following references are of record in the file of this patent:

UNITED STATES PATENTS

| Number | Name | Date |
| --- | --- | --- |
| 1,154,981 | Fennell | Sept. 28, 1915 |
| 1,992,938 | Chambers | Mar. 5, 1935 |
| 2,117,965 | Kiesskalt | May 17, 1938 |
| 2,138,051 | Williams | Nov. 29, 1938 |
| 2,143,099 | Wynn | Jan. 10, 1939 |
| 2,170,178 | Williams | Aug. 22, 1939 |
| 2,363,937 | Brandt | Nov. 28, 1944 |

FOREIGN PATENTS

| Number | Country | Date |
| --- | --- | --- |
| 180,743 | Switzerland | Nov. 15, 1935 |